(12) United States Patent
Eden et al.

(10) Patent No.: US 6,923,263 B2
(45) Date of Patent: Aug. 2, 2005

(54) WELL SEALING METHOD AND APPARATUS

(75) Inventors: Robert David Eden, Cheshire (GB); Robert Henry Eden, Cheshire (GB)

(73) Assignee: Rawwater Engineering Company, Limited, Cheshire (GB)

( * ) Notice: Subject to any disclaimer, the term of this patent is extended or adjusted under 35 U.S.C. 154(b) by 0 days.

(21) Appl. No.: 10/381,608

(22) PCT Filed: Sep. 24, 2001

(86) PCT No.: PCT/GB01/04260

§ 371 (c)(1), (2), (4) Date: Aug. 29, 2003

(87) PCT Pub. No.: WO02/27137

PCT Pub. Date: Apr. 4, 2002

(65) Prior Publication Data

US 2004/0040710 A1 Mar. 4, 2004

(30) Foreign Application Priority Data

Sep. 26, 2000 (GB) .............................. 0023543

(51) Int. Cl.⁷ ............................................. E21B 33/00
(52) U.S. Cl. ....................... 166/288; 166/285; 166/179
(58) Field of Search ......................... 166/63, 288, 292, 166/291, 253, 101, 179, 118, 127, 192

(56) References Cited

U.S. PATENT DOCUMENTS

| 1,631,419 | A | * | 6/1927 | Kinley ........................ 166/63 |
| 2,191,783 | A | | 2/1940 | Jaedike ....................... 166/300 |
| 2,298,129 | A | | 10/1942 | Irons .......................... 166/288 |
| 2,363,269 | A | | 11/1944 | Schlumberger ............ 166/288 |
| 2,942,668 | A | | 6/1960 | Maly .......................... 166/185 |
| 3,208,530 | A | | 9/1965 | Allen et al. ................. 166/60 |
| 3,273,641 | A | | 9/1966 | Bourne ........................ 166/276 |
| 3,333,635 | A | | 8/1967 | Crawford .................... 166/276 |
| 3,419,074 | A | | 12/1968 | Brown ........................ 166/383 |
| 3,420,928 | A | | 1/1969 | Brown ........................ 264/261 |
| 3,578,084 | A | | 5/1971 | Bombardleri et al. ....... 166/288 |
| 3,738,424 | A | | 6/1973 | Osmun et al. .............. 166/298 |
| 3,765,486 | A | | 10/1973 | Matthews et al. .......... 166/290 |
| 3,891,034 | A | | 6/1975 | Owen et al. ................ 166/285 |
| 4,024,916 | A | * | 5/1977 | Hartley et al. .............. 166/288 |
| 4,275,788 | A | * | 6/1981 | Sweatman ................... 166/292 |
| 4,484,750 | A | | 11/1984 | Scruggs ...................... 277/625 |
| 4,487,432 | A | | 12/1984 | Passerell et al. ............. 285/15 |
| 4,489,784 | A | * | 12/1984 | Messenger .................. 166/288 |
| 4,873,895 | A | | 10/1989 | Taylor et al. ............... 76/108.2 |
| 5,137,283 | A | | 8/1992 | Giarrusso et al. ........... 277/312 |
| 5,607,017 | A | * | 3/1997 | Owens et al. ............... 166/288 |

FOREIGN PATENT DOCUMENTS

| WO | WO 01/66990 | 9/2001 |
| WO | WO 01/92687 | 12/2001 |
| WO | WO 01/94741 | 12/2001 |

* cited by examiner

Primary Examiner—Frank Tsay
(74) Attorney, Agent, or Firm—Pillsbury Winthrop Shaw Pittman LLP

(57) ABSTRACT

An apparatus for forming a plug in a casing includes a body of plug material and a carrier for insertion into a casing. The carrier supports the body of plug material. The carrier includes a mandrel and at least two circular flanges spaced apart along the mandrel. The carrier also includes a heater for heating the mandrel. The mandrel is heated to a temperature above the melting point of the material and the plug material slumps into the casing between the at least two circular flanges. The at least two circular flanges force the expanded solidifying plug material against the casing which aids the transfer of heat between the mandrel and the plug material, and resists creep of the solidified material along the casing.

15 Claims, 5 Drawing Sheets

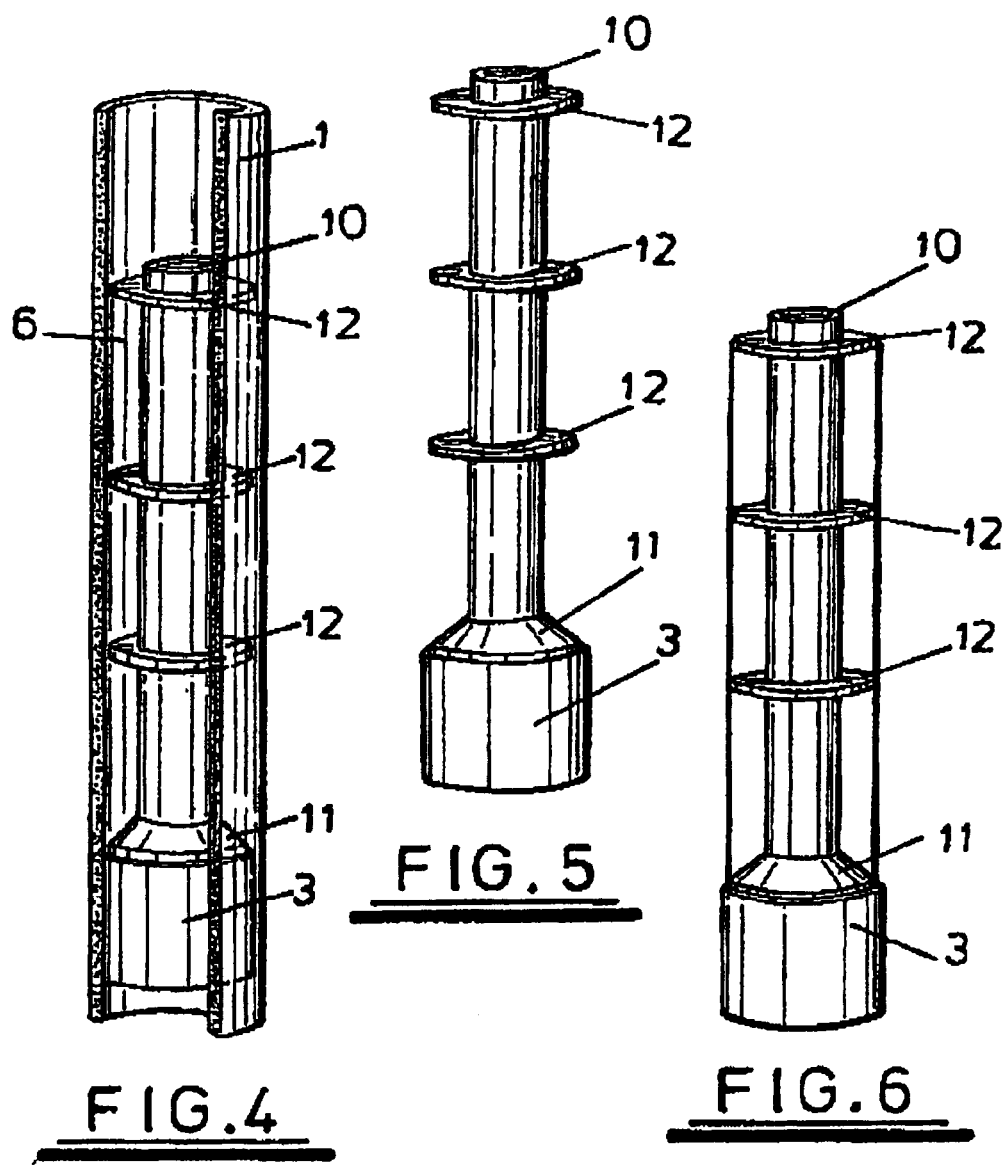

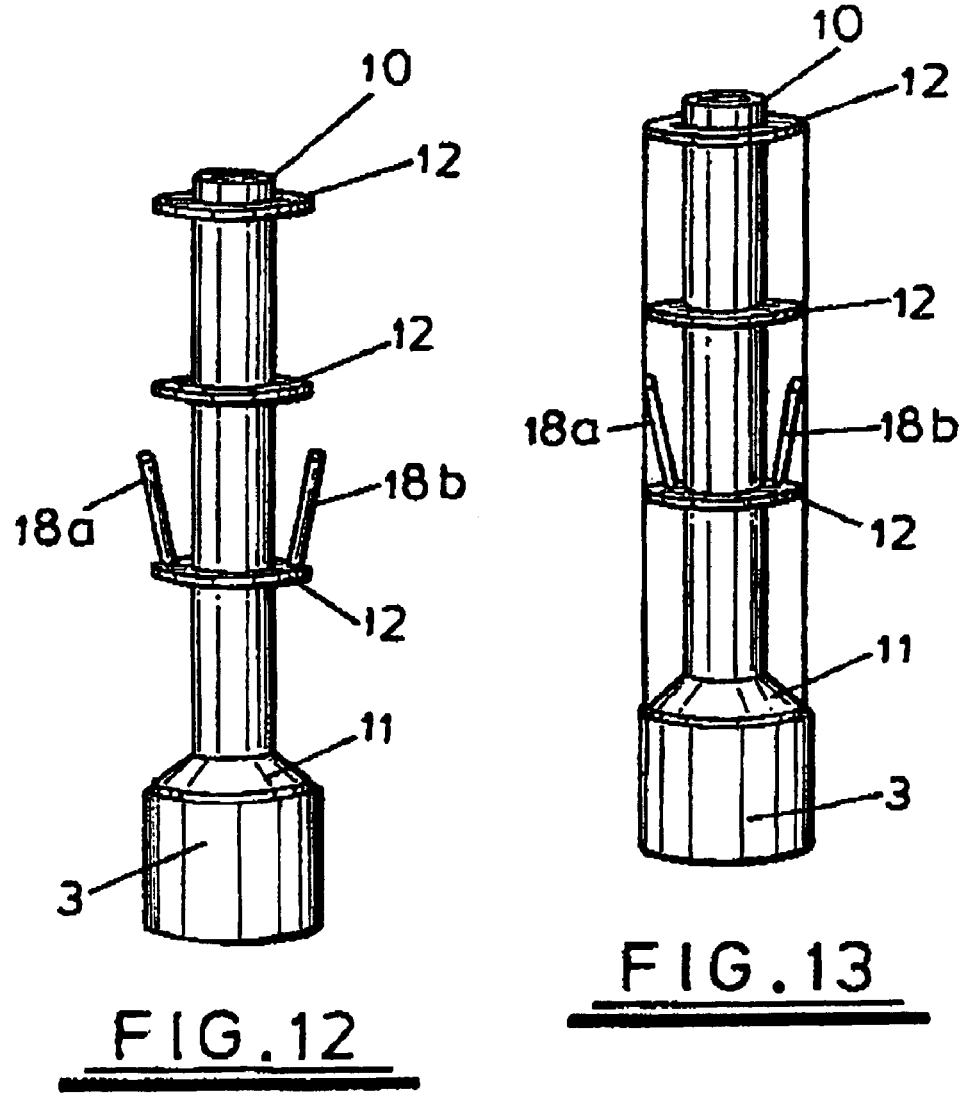

WELL SEALING METHOD AND APPARATUS

This application is the National Phase of International Application PCT/GB01/04260 filed 24 Sep. 2001 which designated the U.S. and that International Application was published under PCT Article 21(2) in English.

The present invention relates to a method and apparatus for sealing underground components to prevent leakage of for example hydrocarbon fluids from those components.

In the oil and gas extraction industries, abandoned wells have to be plugged to keep the contents of deep high pressure environments which communicate with those wells from invading levels at or adjacent the surface. Plugs can be inserted at any point in a well, for example adjacent the surface or at a substantial depth. Typically, plugs are formed by injecting cement or resin into the well so as to fill for example a fifty metre length of the well. Experience has proved however that such plugs are not particularly reliable and often leak.

The known plugs tend to leak for a variety of reasons. Firstly, as the well wall is typically not particularly clean and is also covered with a hydrocarbon film, it is difficult to produce a reliable contiguous seal. Often a contiguous seal of only a metre or so in length is formed with a plug fifty times that length. Furthermore, as cement and resin based plugs solidify they contract which tends to open up a gap between the plug and the well wall. Although when a plug is initially inserted there may be little dynamic pressure in the well, after the plug is in situ substantial pressures can build up and as a result a plug which appears initially to be working satisfactory may subsequently be found to leak. If hydrocarbons leak past the plug contamination of the surface environment or for example a sub-surface aquifer can result. It is well known in the industry that a significant proportion of abandoned wells leak. As a result leaking abandoned wells often have to be re-plugged which is an expensive and time consuming operation.

It is known to form temporary seals in chemical plants by freezing water or other fluids in the plant. Such plugs are used for example to seal pipes whilst work is conducted upon systems connected to those pipes. The advantage of this approach is that the system does not need to be drained prior to work being initiated. Ice plugs do form reliable seals but require continuous cooling given that the sealed pipe will normally be at a temperature above melting point of ice.

It is an object of the present invention to provide a method and apparatus for plugging a well which obviates or mitigates the problems outlined above.

According to the present invention, there is provided a method for forming a plug in a well, wherein a length of the well is filled with a molten material the melting point of which is higher than the temperature within the well and which expands as it solidifies.

The material may be a metal alloy, for example a low-melting point bismuth-containing alloy such as "Rose's metal", "Kraft's alloy" or "Homberg's alloy". The bismuth-containing alloy may be doped with sodium. Such alloys expand upon solidification and thus once deposited in a well they lose heat into the surrounding environment, solidify, and in solidifying expand to form a secure plug within the well.

The material may be delivered to the well in a molten state. For example a canister of molten material may be lowered to the intended site of the plug and opened either by remote control or deliberate rupture of the canister. For sodium doped material the doping may be achieved by adding an ingot of sodium to the material when in a molten state when the alloy is first prepared. The sodium is added when the alloy is first manufactured, not "down-hole" when it is used to form the plug.

Alternatively, the material may be delivered to the well in a solidified state, subsequently melted in the well, and then allowed to solidify. For example, the material could be delivered in granular form, for example in a carrier fluid. The granular material could then be melted in any suitable manner, thereafter cooling to form a solidified plug. The granular material could be melted by delivering it in a first fluid, then adding a second fluid which when mixed with the first elevates the temperature to above the melting point of the granular material. The granular material then melts, and subsequently cools to form a solidified plug. The first fluid could be for example inhibited hydrochloric acid whereas the second could be for example caustic soda.

As a further alternative the plug material may be delivered to the well and located therewithin mounted in solid form on a carrier. Such a carrier may comprise a chemical heater, for example a "Thermit" mixture, which when ignited provides thermal energy to melt the plug material when it is located at the required well depth. The carrier may incorporate an engagement means to engage the well casing when in position. Such engagement means may be arranged to allow insertion of the carrier into the well and movement in a down-hole direction therein but prevent up-hole movement. This may be achieved by coupling the engagement means to the carrier via a hinge.

Non-chemical methods of melting the plug material could of course be used, for example steam, heated water, electrical resistance heating, frictional heating, sonothermic (sound generated) heating, cavitational (pressure generated) heating, or even simply introducing a solid high thermal capacity mass from which heat is transferred into the previously deposited granular material.

As a further alternative, a first component of the material which has a melting point lower than the temperature within the well may be delivered in a molten state, and a second component may then be added to the first, the second component mixing with the first and the resultant mixture having a melting point which is higher than the temperature within the well. Thus the first component could be accurately positioned in situ, visually inspected and then converted into a solid plug simply by pouring the second component into the well so that it mixes with the first component.

Once the molten material has solidified and formed a plug it may be capped with a coating material. A preferred example of a suitable coating material is concrete.

Embodiments of the present invention will now be described, by way of example, with reference to the accompany drawings in which:

FIG. 4 is a schematic representation of a third method for plugging a well in accordance with the present invention;

FIGS. 5, 6 and 7 are side views of components used in the third method;

FIGS. 12 and 13 are side views of components used in the fourth method.

Figures 1, 2, 3:
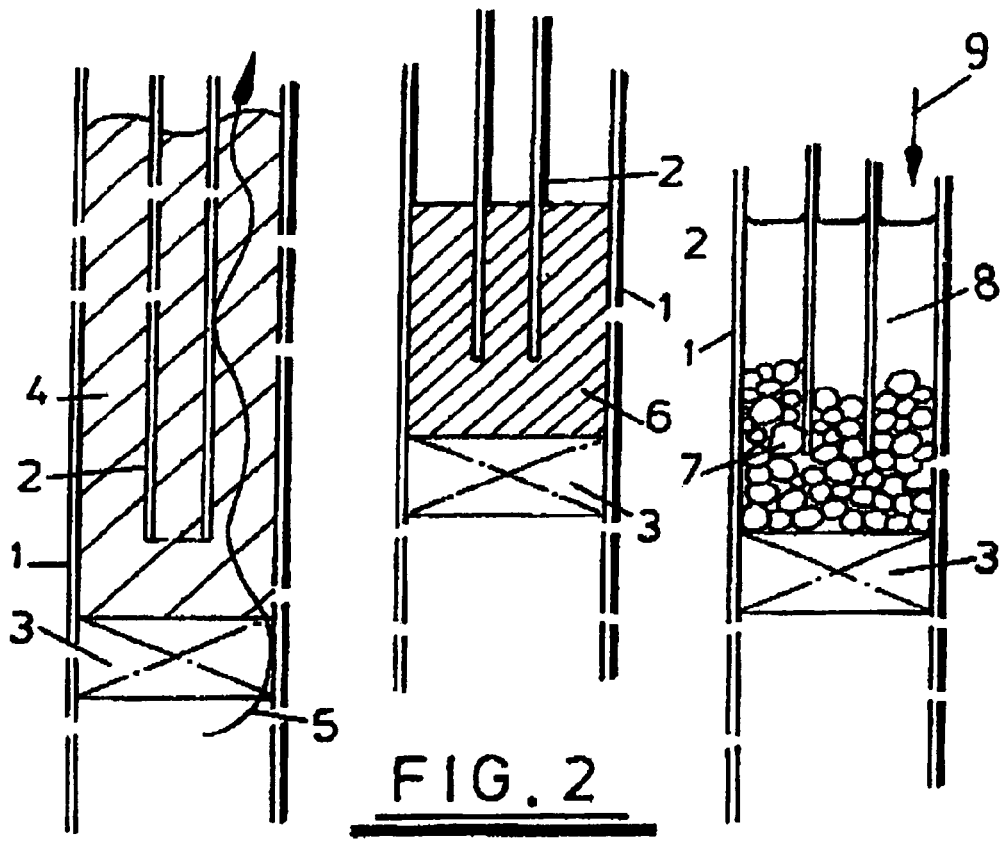
FIG. 1 is a schematic representation of a conventional well plugging method.
FIG. 2 is a schematic representation of a first method for plugging a well in accordance with the present invention.
FIG. 3 is a schematic representation of a second method for plugging a well in accordance with the present invention.

Referring to FIG. 1, an oil well has a casing 1 within which production tubing 2 extends axially. In order to plug the well, it is necessary to block both the annular passageway between the casing 1 and the production tubing 2 itself. Conventionally this is achieved by blocking the casing 1 beneath the production tubing 2 by inserting a packer 3. The space above the packer 3 is then filled with cement 4 to a depth typically of 50 meters. The cement then solidifies, forming the required plug.

The surface of the casing 1 and the surface of the production tubing 2 contacted by the cement are not ideal for forming sealing interfaces. Those surfaces are contaminated with hydrocarbon components and other deposits. Furthermore, as the cement hardens, it tends to contract so that in the absence of adhesion between the cement 4 and the casing 1 an annular gap can develop between the cement 4 and the casing 1. Although at the time the well is plugged generally there will be little upwards flow through the well because the seal is initially adequate, over time the seal can fail so that fluids will migrate up the gap created by seal failure. As a result unwanted fluid can leak past the plug 4 (shown by arrow 5), risking contamination of the local environment.

Referring now to FIG. 2, this illustrates a first embodiment of the present invention. The same reference numerals are used for equivalent components as in FIG. 1. In contrast to the cement plug 4 of FIG. 1 however in FIG. 2 a bismuth alloy plug 6 is formed within the casing 1 above the packer 3. The length of casing 1 filled with the plug 6 is relatively small as compared with the length of casing filled by the cement 4 as shown in FIG. 1. Typically the length of casing 1 filled with the plug 6 is an order magnitude less than that often encountered with cement plugs (typically 50 meters). Nevertheless, the arrangement of FIG. 2 provides a reliable plug 6 because the bismuth alloy is initially molten within the casing 1 but subsequently solidifies and during solidification expands to tightly engage the casing 1 and the production tubing 2. Thus a solid plug 6 expanded metal seals the casing 1 and locks together and components contracted by the plug 6.

The bismuth alloy plug 6 could be formed from one of the low-melting point bismuth containing alloys known from the printing industry, for example "Rose's metal" (melting point 93° C.), "Kraft's alloy" (melting point 104° C.), "Homberg's alloy" (melting point 122° C.) or any alloy which may be developed to have characteristics suitable for the down-hole conditions. For example antimony could be used to form higher temperature melting point alloys. Such alloys increase in volume upon solidification and thus are sometimes referred to as "expanding metal alloys". The unusual property of expansion upon solidification has been used to advantage in the printing industry to lock printing blocks into printing frames. In the environment to which the present invention relates, once installed the bismuth alloy plug 6 will be a permanent fixture given that the stable temperature of the local environment ensure that it remains in a solid state. As the plugs expand on solidification, they form reliable seals along their entire length.

The solid plug 6 of FIG. 2 can be formed by delivering molten bismuth alloy in a canister or the like which is lowered to just above the packer 3 and then opened or ruptured as convenient. The released molten alloy flows to form a solid plug 6 above the packer 3 and then cools to the local temperature (typically 40–100° C.). Thus the plug 6 solidifies and expands. Alternatively, the alloy could be delivered via a coiled tubing placement system.

Optionally the bismuth alloy may be doped with sodium. This may be achieved by adding an ingot of sodium to the bismuth alloy when it is molten during the manufacturing process. It will be appreciated that as sodium melts at a low temperature (98° C.) it will melt in the molten alloy and become dispersed. Other methods of doping such as ion bombardment and pre-doping of the bismuth alloy before it is located in situ are not hereby precluded. The doping of the bismuth alloy may be such that around 1% of the alloy is comprised of sodium. It is postulated that doping with sodium serves as an aid in preventing creep of the bismuth alloy plug 6.

As an alternative to delivering molten alloy to the space above the packer 3, it would be possible to deliver a solid alloy in for example granular form and then to melt the alloy in situ using any convenient heating system. FIG. 3 illustrates one arrangement in which the necessary heating is delivered by an exothermic reaction.

Referring to FIG. 3, this illustrates a second embodiment of the present invention. Once again the same reference numerals are used as in FIG. 1 where appropriate. The space above the packer 3 however is filled with a layer of bismuth alloy granules 7 immersed in a carrier fluid of for example inhibited hydrochloric acid 8. The acid 8 cleans the surfaces of the down hole components above the packer 3 but does not attack the metal of the down hole components nor the bismuth alloy granules 7. All of the introduced materials will warm up to the local ambient temperature. This is too low to cause the granules to melt. A further component can then be added, that is caustic soda (illustrated by arrow 9), which reacts with the hydrochloric acid 8 in an exothermic reaction that elevates the local temperature to above the melting point of the alloy granules 7. The granules 7 thus melt and coalesce. In most applications, the local pressure will be sufficiently high to prevent the reactants from boiling and dissipating the generated heat. The end reaction products of the cooled acid 8/alkali 9 reaction are sodium chloride and water which are benign to the natural environment. It will of course be appreciated that other exothermic reactions could be used. It will also be appreciated that any other convenient method for melting the alloy granules 7 could be used.

Referring now to FIGS. 4–10 a third embodiment of the invention is illustrated using the same reference numbers as above where appropriate. Once again a bismuth alloy plug 6 is formed within the casing 1 above the packer 3. In contrast to the first and second embodiments of the invention, the solid bismuth alloy plug 6 (shown in FIG. 4) is formed from an amount of bismuth alloy delivered in solid form on a carrier spool to the required depth within the casing 1.

The carrier spool may comprise 1% manganese steel. The carrier spool comprises a tubular mandrel 10. The mandrel 10 has an upper open end. The lower end of the mandrel 10 terminates in a head 11, upon which a cylindrical packer 3 (preferably comprising vulcanised rubber including 40% acrylonitrile) is mounted. The packer 3 may be mounted on the head by a method which includes a bonding step, thus forming a metallelastic bond. The head 11 defines a frustocone the base of which has a lower diameter than that of the packer 3 and which tapers from the upper surface of the packer 3 to the mandrel 10. The mandrel 10 has a plurality of circular flanges 12 in the form of fins distributed at intervals along its length. The diameter of each fin 12 is approximately equal to the diameter of the base of the frustocone 11.

In delivery form (shown in FIG. 6) the solid metal locates along the length of the mandrel 10 between the head 11 and an upper fin 12, defining a cylinder extending as far as the peripheral edge of the upper fin 12. The metal may comprise, for example, pure bismuth, an admixture of 95% bismuth and 5% tin or an admixture of 52% bismuth and 48% tin, in each case the metal may be doped with sodium. In this form the carrier spool is inserted into the casing 1 (packer end first) and lowered to the required depth.

Figure 7:
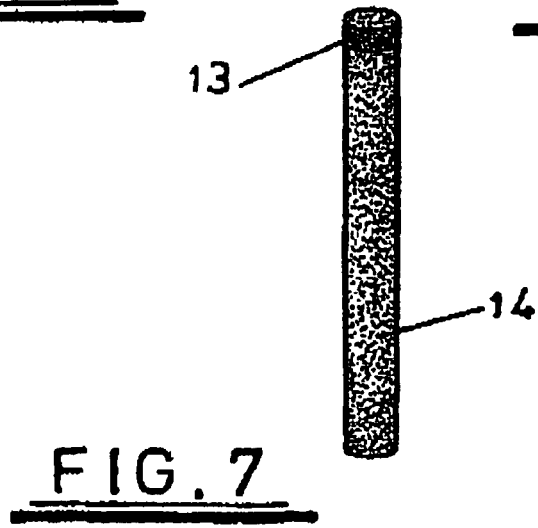

Thus positioned the bismuth alloy is melted in situ by a heater which normally locates within the mandrel 10 (but which is illustrated for clarity in FIG. 7 outside the mandrel 10). The heater defines a cylinder, an upper portion of which comprises an ignition source 13 and a lower portion of which comprises a heater element 14. The heater element 14 may comprise an admixture of aluminium and iron oxide (thermit mixture). The ignition source 13 may comprise a barium peroxide fuse and an electrical heater. It will be appreciated that other forms of both ignition source 13 and heater element 14 could be used.

Figures 8, 9:
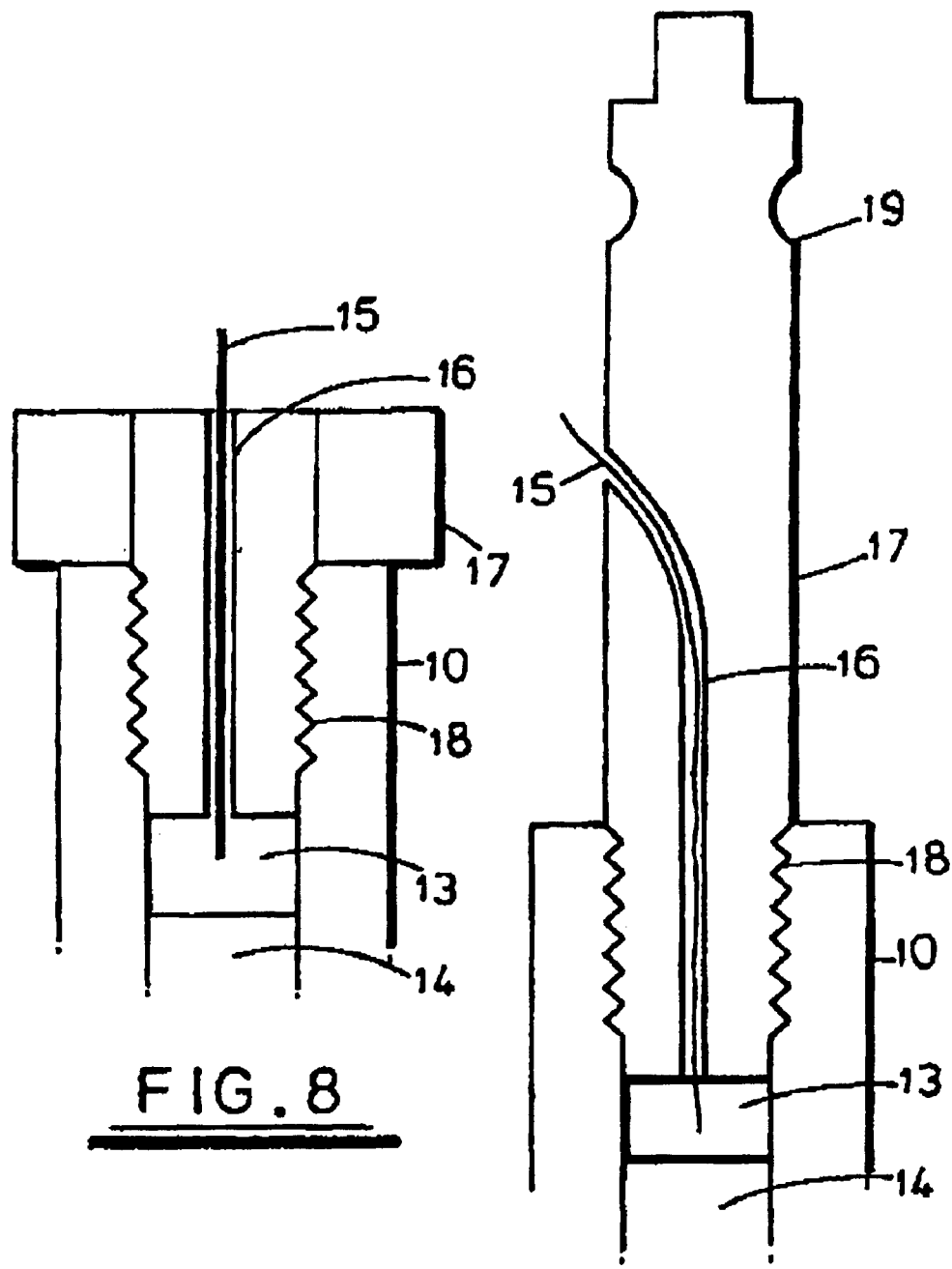
FIGS. 8, 9 and 10 are schematic cross-sections (viewed from the side) of components used in the third method.
Figure 10:
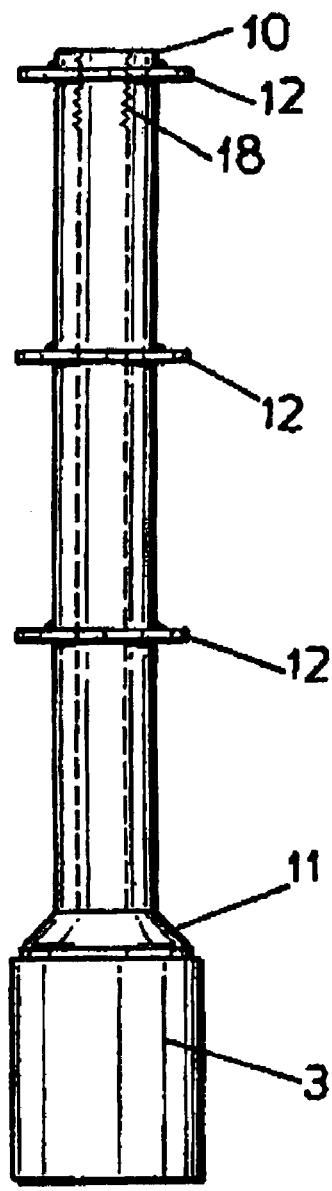

Commonly the ignition source 13 is activated using a fuse 15. The fuse 15 is preferably disposed in a bore 16 in a threaded cap 17 which engages a threaded portion 18 of the mandrel 10. The cap 17 may define a simple hollow plug (as shown in FIG. 8) or may include features such as incisions 19 (as shown in FIG. 9) which allow the cap 17 to be engaged by other equipment (not shown) such as a deployment tool. The cap 17 may define a stab connector.

Activation of the detonator 13 triggers the heater element 14. Heat produced from the heater element 14 causes the bismuth alloy supported on the mandrel 10 to become molten. Combustion/waste gases which may be produced from the heater element 14 are allowed to be vented by the open end of the mandrel 10 and the cap 17.

The molten bismuth alloy thus slumps into the volume defined by the upper surface of the rubber packer 3 and the casing wall 1 (as shown in FIG. 6).

The frustocone 11 is able to serv as a wedge that drives into the expanded bismuth alloy plug 6. Thus pressure from the reservoir serves to force the plug 6 against the casing wall 1.

The fins 12 serve three purposes. Firstly the fins 12 aid in forcing the expanding metal against the casing 1 by minimising axial and promoting lateral expansion. Secondly the fins 12 aid the transfer of heat from the heater element 14 to the bismuth alloy. Thirdly the fins 12 aid in reducing creep of the bismuth alloy plug 6 up hole.

Figure 11:
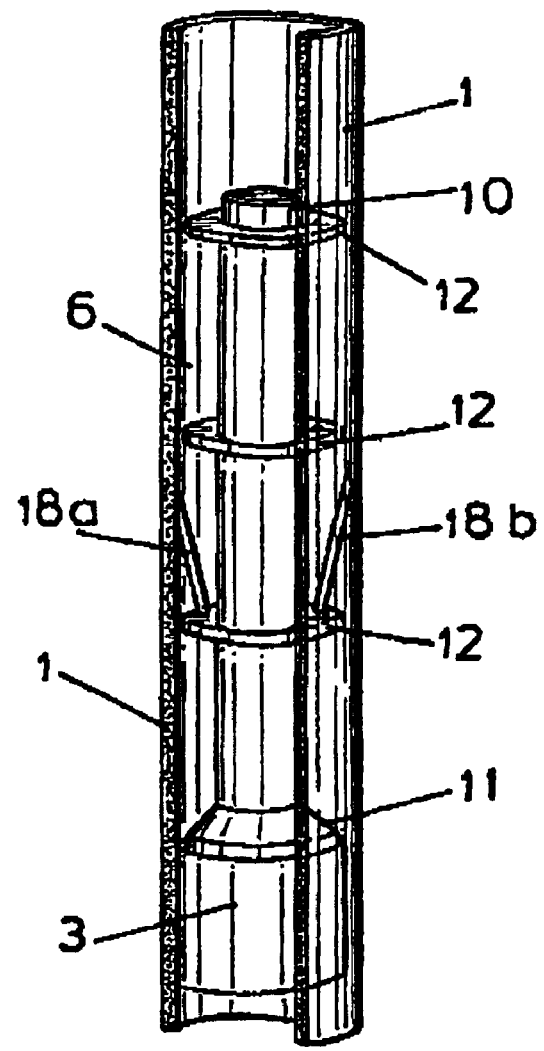
FIG. 11 is a schematic representation of a fourth method for plugging a well in accordance with the present invention.

Referring now to FIGS. 11 to 13 a fourth embodiment of the invention is illustrated. Once more a bismuth alloy plug 6 is formed within the casing 1 above a packer 3. The bismuth alloy is delivered using a carrier spool as in the third embodiment. The fourth embodiment differs from the third embodiment in that casing engagement means are coupled to a fin 12 on the carrier spool.

The casing engagement means comprises arms 20a and 20b coupled by a hinge (not shown) to an upper surface of a fin 12. Although two arms 20a, 20b are illustrated coupled to one fin 12 it will be appreciated that additional arms may be included, either coupled to the same or other fins 12. The non-coupled ends of arms 20a and 20b have one or a plurality of casing engagement members (not shown), which may comprise for example a spike, a tooth, a chisel or another engagement member.

In delivery form the arms 20a, 20b are retained within the bismuth alloy so that the carrier spool carrying the bismuth alloy may be located at the required depth in the casing 1. Activation of the heater element 14 causes the bismuth alloy to be melted and thus the arms 20a, 20b are free to fall into engagement with a portion of the casing 1.

As the bismuth alloy solidifies and expands the arms 20a, 20b are urged into a pressured engagement with the casing 1. Thus deployed the arms 20a, 20b act as an aid in preventing reservoir pressure induced creep of the plug 6 along the well. Indeed any increase in reservoir pressure will merely cause stronger engagement of the engagement means with the casing 1.

In a further embodiment of the invention which is not specifically illustrated, an alloy could be introduced the melting point of which is lower than the ambient temperature immediately above the packer 3. The composition of the alloy could then be changed to raise its melting point above the local ambient temperature. For example, alloys are known which have melting points below 40° C. but into which lead can be introduced to form a mixture the melting point of which is well above 40° C. Thus one could envisage the formation of a plug by pouring a first component into the well so as to form a body of liquid alloy immediately above a packer, inspecting the deposited liquid alloy to ensure that the alloy is safely retained in place, and then simply pouring lead granules into the well such that the granules become immersed in the liquid alloy, causing the combined liquid/alloy lead granule mixture to form a solid plug.

In a yet further embodiment of the invention which is not specifically illustrated a further plug may be formed above the plug of solidified material. Such a further plug may be used to provide additional resistance against creep of the plug of scheduled material caused by pressure from the reservoir. As the further plug is not being used to provide a seal for the well its length need not be of the same order of magnitude as conventional plugs described in the prior art. For example the further plug may be of the order of 5–10 meters long. A preferred material for the further plug is concrete.

What is claimed is:

1. A method for plugging a casing using a body of plug material into the casing on a carrier, the body of plug material having a melting point higher than the temperature of the casing to be plugged and expanding on solidification, the plug material being supported on a mandrel on which a plurality of circular flanges are spaced apart, comprising:
    inserting the mandrel carrying the body of plug material into the casing;
    heating the mandrel to a temperature higher than the melting point of the plug material so that the body of plug material melts to become molten plug material and slumps into the casing between the circular flanges; and
    cooling the molten material to solidify between the circular flanges, the circular flanges forcing the expanding solidifying plug material against the casing, which aids the transfer of heat between the mandrel and the plug material and reduces creep of the plug material along the casing.

2. A method according to claim 1, wherein a packer is supported on a mandrel beneath the circular flanges to prevent molten plug material flowing away from the circular flanges.

3. The method according to claim 1, wherein the plug material is metal alloy.

4. The method according to claim 3, wherein the plug material is a bismuth-containing alloy.

5. The method according to claim 3, wherein the plug material is doped with sodium.

6. The method according to claim 1, further including adding a further plug above the plug material when solidified.

7. The method according to claim 6, wherein the further plug includes concrete.

8. An apparatus for forming a plug in a casing, comprising:
a body of plug material; and
a carrier for insertion into a casing to support the body of plug material, the carrier including
a mandrel,
at least two circular flanges spaced apart along the mandrel, and a heater for heating the mandrel, and
wherein the plug material has a melting point higher than the temperature within the casing and lower than a temperature to which the heater heats the mandrel, the plug material expanding when it solidifies, and the plug material being carried on the mandrel such that if the mandrel is heated within the casing to a temperature above the melting point of the plug material, the plug material slumps into the casing between the at least two circular flanges and the at least two circular flanges forcing the expanded solidifying plug material against the casing, which aids the transfer of heat between the mandrel and the plug material, and resists creep of solidified material along the casing.

9. The apparatus according to claim 8, including a packer supported on a bottom end of the mandrel.

10. The apparatus according to claim 8, further including arms retained within the plug material, the arms being arranged to fall into engagement with a casing which the plug material is melted.

11. The apparatus according to claim 8, wherein the plug material is a metal alloy.

12. The apparatus according to claim 11, wherein the plug material is a bismuth-containing alloy.

13. The apparatus according to claim 11, wherein the plug material is doped with sodium.

14. The apparatus according to claim 8, including a frustoconical head at a lower end of the mandrel beneath the circular flanges, the frustoconical head tapering upwards.

15. The apparatus according to claim 8, wherein the mandrel is tubular, and the heater is received within the tubular material.

* * * * *